(12) United States Patent
Trembley

(10) Patent No.: US 7,650,690 B2
(45) Date of Patent: Jan. 26, 2010

(54) PALLET STACKER APPARATUS

(76) Inventor: Robert Trembley, Box 802, Davidson, SK (CA) S0G 1A0

( * ) Notice: Subject to any disclaimer, the term of this patent is extended or adjusted under 35 U.S.C. 154(b) by 820 days.

(21) Appl. No.: 11/301,861

(22) Filed: Dec. 12, 2005

(65) Prior Publication Data
US 2006/0182612 A1    Aug. 17, 2006

(30) Foreign Application Priority Data
Dec. 10, 2004    (CA) .................................. 2489967

(51) Int. Cl.
*B23P 19/00*    (2006.01)
*B65H 29/00*    (2006.01)

(52) U.S. Cl. .............................. 29/822; 29/784; 29/722; 414/788.1

(58) Field of Classification Search .................... 29/822, 29/823, 771, 33 P, 783, 784, 785, 430, 772; 414/788.1
See application file for complete search history.

(56) References Cited

U.S. PATENT DOCUMENTS

| 4,492,016 | A | | 1/1985 | Smets et al. | |
|---|---|---|---|---|---|
| 5,355,575 | A | | 10/1994 | Self | |
| 5,555,617 | A | * | 9/1996 | Pope | 29/772 |
| 6,499,206 | B1 | * | 12/2002 | Eure et al. | 29/430 |
| 6,736,591 | B2 | * | 5/2004 | Buck | 414/797.9 |
| 6,763,567 | B2 | * | 7/2004 | Smith et al. | 29/430 |

* cited by examiner

*Primary Examiner*—John C Hong
(74) *Attorney, Agent, or Firm*—Fulbright & Jaworski L.L.P.

(57) ABSTRACT

An apparatus to facilitate movement of a pallet from an assembly table to a pallet stacker comprises a roller frame adapted for movable attachment to the pallet stacker in front of the entrance to the pallet opening such that the roller frame can be moved, in a direction substantially horizontal and perpendicular to the loading direction, from a receiving position nearest to the assembly table, to a remote position farthest from the assembly table. A pallet roller is rotatably attached on top of the roller frame about a substantially horizontal axis oriented substantially perpendicular to the loading direction. The pallet roller supports a pallet in a substantially horizontal position such that the supported pallet can be rolled into the pallet opening of the pallet stacker. Conveniently a bias force is provided to return the roller frame to the receiving position when the pallet has been rolled off.

8 Claims, 3 Drawing Sheets

FIG. 3
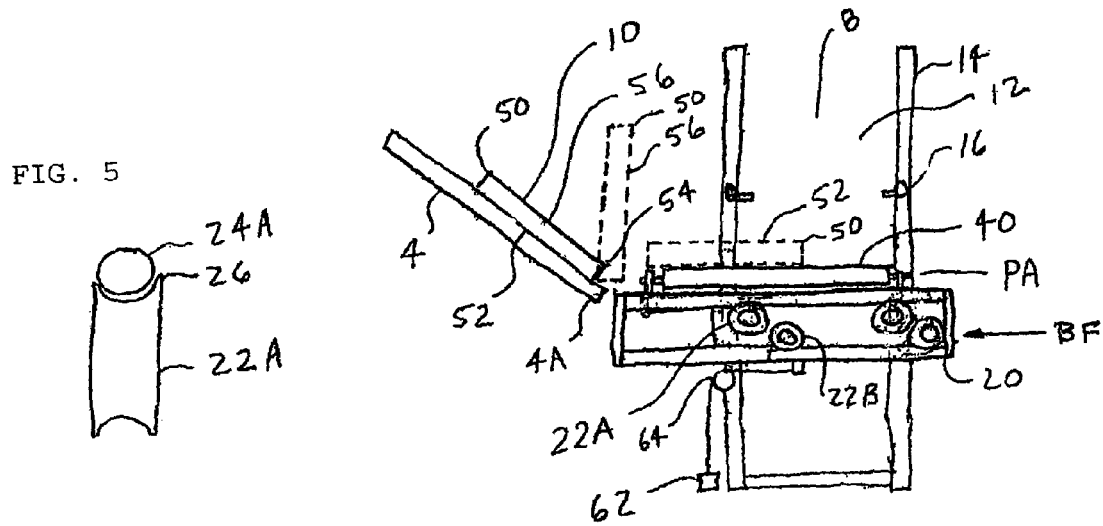
FIG. 5
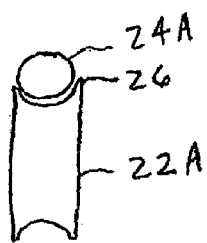
FIG. 4
FIG. 6
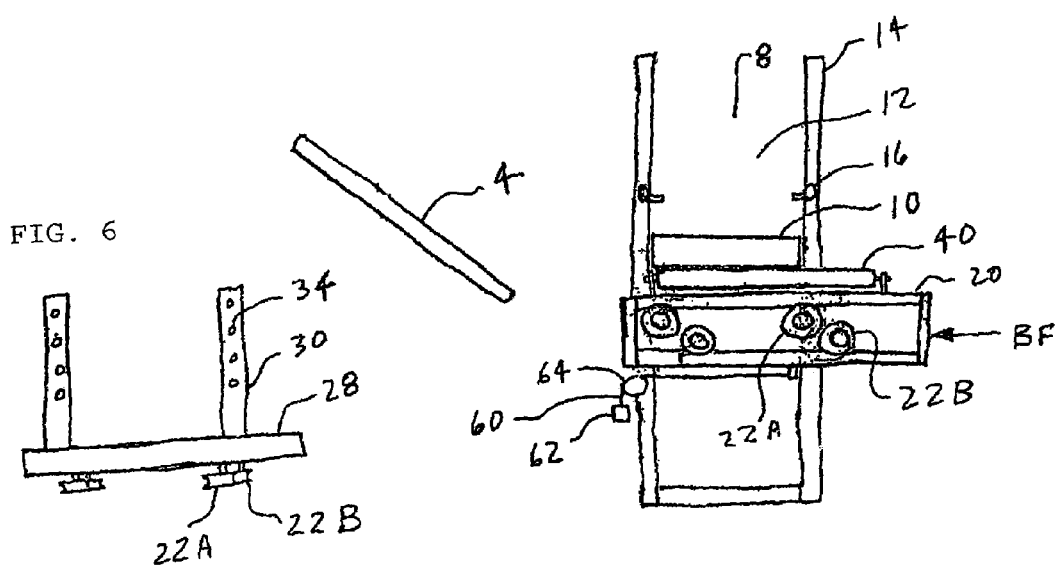

PALLET STACKER APPARATUS

This invention is in the field of machines for assembling structures, and in particular such machines for assembly of pallets used in the shipping of goods.

BACKGROUND

Pallets, and especially wooden pallets are an essential component in the shipping and handling of commercial goods. The demand for pallets continues to increase each year, with the result that improvements in the apparatus and methods used in their construction are desirable. Pallets are constructed by assembling a number of wood, plastic or metal members to produce a frame structure with internal support members and top and bottom surfaces upon which freight is placed and the pallet rests. While pallets can be constructed by hand, the development of machine methods of pallet construction permits an individual operator to build pallets more accurately, rapidly, and safely.

Machines for building pallets are known in the art, as disclosed for example in U.S. Pat. No. 5,249,352 to Landers and Canadian Patent Number 2,446,055 to the present inventor Tremblay. Once the pallet is finished it is moved off the pallet making machine, and commonly onto to a pallet stacker which stacks the pallets for convenient storage.

Typically such a pallet stacker provides a vertical frame that defines a pallet opening between right and left vertical frame members. A bottom or floor of the pallet opening comprises a lift mechanism. Typically the distance between the vertical frame members can be adjusted to suit pallets of varying widths. The operator slides the pallet in a horizontal orientation between the vertical frame members and onto the lift mechanism. The lift mechanism then moves the pallet upward between the vertical frame members. Typically catches are positioned on the vertical frame members such that same are pushed upward by the upward moving pallet, and once the pallet moves up past the catches, the catches fall back down under the pallet. The lift mechanism then moves downward but the pallet rests on the catches above the opening and the lift mechanism moves down to a position under the pallet opening, ready to receive another pallet and repeat the process.

In such pallet stackers, the lift mechanism typically operates automatically through a cycle of raising the pallet and then dropping to receive another pallet automatically in response to the operator activating a switch. Thus the lift mechanism can move relatively slowly while the operator is making the next pallet, and still be ready to receive the next pallet when it is finished. When a desired number of pallets have been stacked, the pallet stacker can in some cases provide a mechanism that will allow the stack of pallets to be rolled out of the stacker to make room for a new stack, or the stack can be removed with a forklift or the like.

U.S. Pat. No. 5,355,575 to Self discloses a pallet moving device for moving a finished pallet off a slant table upon which it is made, and onto a pallet stacker. Such slant tables provide a convenient operator position for pallet assembly and nailing, and are commonly used as also shown in Canadian Patent Number 2,446,055 to Tremblay and in U.S. Pat. No. 4,077,106 to Lichtenstein et al. The Self device moves the finished pallet upward and rearward off the slant table using two arms.

U.S. Pat. No. 4,492,016 to Smets et al. discloses a pivoting assembly table which can be slanted at varying degrees for assembly, and a pair of runways with rollers mounted thereon beneath the table. The mechanism allows the finished pallet to drop onto the runways and roll away to a stacker or other location.

It is also common in less automated machines for the operator to simply manually lift the pallet off the assembly table and slide into the pallet opening on a pallet stacker located in front of the assembly table and beside the location where the operator would ordinarily stand while using the machine. Where the assembly table is in the common slanted orientation, the operator will normally pull the top of the pallet toward him while the bottom of the pallet rests on the front bottom edge of the table, pivoting the pallet up and over such that the pallet surface that was resting on the assembly table moves to a horizontal position on top of the pallet. The operator will then lift the pallet, align it with the pallet opening in the pallet stacker, and then slide it into the pallet opening.

SUMMARY OF THE INVENTION

It is an object of the present invention to provide a pallet stacker apparatus that overcomes problems in the prior art.

The present invention provides in one embodiment, an apparatus to facilitate movement of a pallet from an assembly table to a pallet stacker, wherein the pallet stacker defines a pallet opening oriented such that a substantially horizontal pallet can be moved in a loading direction through an entrance of the pallet opening and into the pallet opening. The apparatus comprises a roller frame adapted for movable attachment to the pallet stacker in front of the entrance to the pallet opening such that the roller frame can be moved, in a direction substantially horizontal and perpendicular to the loading direction, from a receiving position, where during operation the roller frame is nearest to the assembly table, to a remote position, where during operation the roller frame is farthest from the assembly table; and a pallet roller rotatably attached to a top of the roller frame about a substantially horizontal axis oriented substantially perpendicular to the loading direction, the pallet roller adapted to support a pallet in a substantially horizontal position such that the supported pallet can be rolled into the pallet opening.

In a second embodiment the invention provides pallet making apparatus comprising an assembly table oriented at an angle such that the assembly table extends upward and rearward from a bottom front edge to a top rear edge. A pallet stacker is located in front of and to one side of the assembly table, the pallet stacker defining a pallet opening oriented such that a substantially horizontal pallet can be moved in a loading direction through an entrance of the pallet opening and into the pallet opening. A roller frame is movably attached to the pallet stacker in front of the entrance to the pallet opening such that the roller frame can be moved, in a direction substantially horizontal and perpendicular to the loading direction and perpendicular to the bottom front edge of the assembly table, from a receiving position, where the roller frame is nearest to the assembly table, to a remote position where the roller frame is farthest from the assembly table. A pallet roller is rotatably attached to a top of the roller frame about a substantially horizontal pallet roller axis oriented substantially perpendicular to the loading direction and perpendicular to the bottom front edge of the assembly table, and the pallet roller is configured to support a pallet in a substantially horizontal position such that the supported pallet can be rolled into the pallet opening. The pallet roller axis is oriented to intersect the assembly table such that a top edge of a finished pallet with a first face thereof resting on the assembly table can be pivoted by an operator up and over a bottom edge of the pallet resting in proximity to the bottom front edge of the assembly table to a substantially horizontal position with the first face oriented substantially horizontally and on top of the pallet, and an opposite second face resting on the pallet roller with the roller frame in the receiving position. The operator can then move the pallet, pallet roller, and roller frame away from the assembly table toward the remote position until the pallet is aligned with the entrance to the pallet opening, and the operator can then move the pallet in the loading direction into the pallet opening by rolling same on the pallet roller.

The apparatus of the invention can be used with conventional assembly tables and pallet stackers to facilitate movement of a pallet from the assembly table to the pallet stacker. Instead of lifting the pallet and carrying its whole weight, the operator can pivot the pallet from a slanted assembly table onto the pallet roller, then move the pallet roller on the roller frame and rollers or the like away from the assembly table until the horizontal pallet is aligned with the pallet opening, then push the pallet toward and into the pallet opening thereby rotating the pallet roller. When the pallet has rolled off the pallet roller, a bias force can be conveniently provided such that once the pallet is off the pallet roller, the roller frame automatically returns, in response to the bias force, to the receiving position ready to receive the next pallet.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 3 is a schematic front view showing pivotal movement of the pallet from the assembly table to a horizontal position supported by the pallet roller;

FIG. 4 is a schematic front view showing the pallet supported by the pallet roller and aligned with the entrance to the pallet opening on the pallet stacker;

FIG. 5 is schematic end view sowing the top rail of the roller frame engaged between flanges on an upper pulley roller;

FIG. 6 is a top view of a pulley frame adapted to be mounted on a pallet stacker;

DETAILED DESCRIPTION OF THE
ILLUSTRATED EMBODIMENTS

Figure 1:
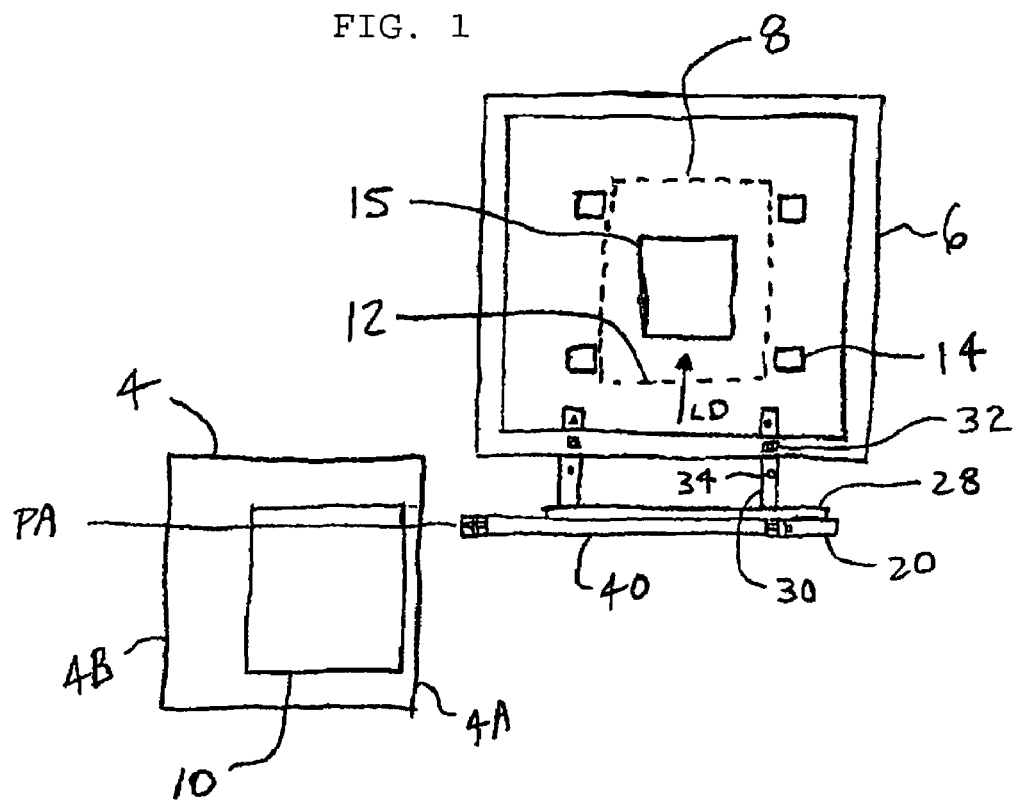
FIG. 1 is a schematic top view of a pallet making apparatus of the invention.
Figure 2:
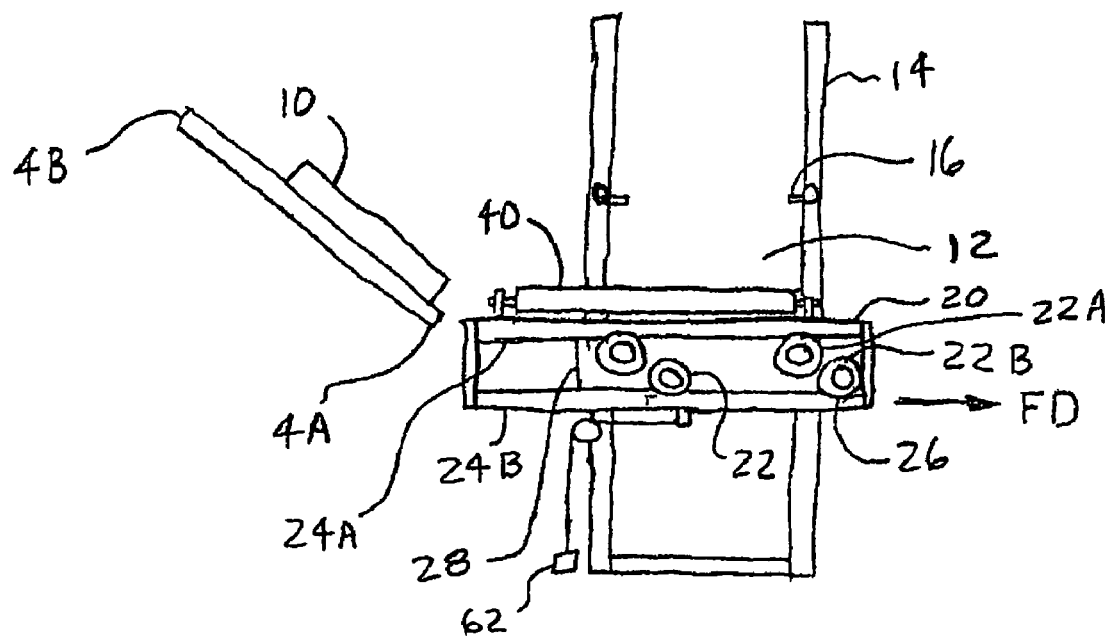
FIG. 2 is a schematic front view of the apparatus of FIG. 1 showing a finished pallet on the assembly table.

FIGS. 1-4 schematically illustrate a pallet making apparatus 1 of the present invention. The apparatus 1 comprises an assembly table 4 oriented at an angle such that the assembly table extends upward and rearward from a bottom front edge 4A to a top rear edge 4B. A pallet stacker 6 is located in front of and to one side of the assembly table 4 as shown in FIG. 2. The assembly table 4 comprises jigs and nail drivers as is well known in the art, and for simplicity of illustration same are not illustrated.

The pallet stacker 6 is also well known in the art, and defines a pallet opening 8 oriented such that a substantially horizontal pallet 10 can be moved in a loading direction LD through an entrance 12 of the pallet opening 8 and into the pallet opening 8, as illustrated in FIG. 4. The entrance 12 of the pallet opening 8 is typically defined by a pair of front vertical frame members 14, and a further pair of rear vertical frame members 14, all with catches 16 pivotally mounted thereon for supporting a stack of pallets in a conventional manner. In a typical pallet stacker 6 the vertical frame members 14 can be moved closer together or farther apart to accommodate pallets with different widths. A lift mechanism 15 provides a floor for the pallet opening 8 and operates to raise the pallets for stacking in the known manner.

A roller frame 20 is movably attached to the pallet stacker 6 in front of the entrance 12 to the pallet opening 8 such that the roller frame 20 can be moved, in a frame direction FD substantially horizontal and perpendicular to the loading direction LD and perpendicular to the bottom front edge 4A of the assembly table 4, from a receiving position, illustrated in FIGS. 1-3 where the roller frame 20 is nearest to the assembly table 4, to a remote position where the roller frame 20 is farthest away from the assembly table 4.

In the illustrated embodiment the roller frame 20 is movably attached to the pallet stacker 6 by a plurality of pulley rollers 22 rotatably attached to the pallet stacker 6 about axes substantially aligned with the loading direction LD, and rails 24 engaging the pulley rollers 22. A pair of upper pulley rollers 22A are rotatably attached to the pallet stacker 6 about laterally spaced upper axes oriented such that a line between the upper axes is substantially horizontal as illustrated. A pair of lower pulley rollers 22B are rotatably attached to the pallet stacker 6 about laterally spaced lower axes oriented such that a line between the lower axes is substantially horizontal and below the line between the upper axes. The pulley rollers 22 are flanged, and the roller frame 20 comprises an upper rail 24A engaging flanges 26 on a top of the upper pulley rollers 22A as schematically shown in FIG. 5, and a similar lower rail 24B engaging flanges 26 on a bottom of the lower pulley rollers 22B.

As shown in FIG. 6, in the illustrated embodiment the pulley rollers 22 are mounted on a pulley frame 28 mounted on the pallet stacker 6 such that a distance between the pulley frame 28 and the entrance 12 to the pallet opening 8 is adjustable. Extension members 30 extend from the pulley frame 28 and are substantially aligned with the loading direction LD. The extension members 30 are attachable to the pallet stacker 6 at a plurality of locations along a length thereof, illustrated by bolts 32 through holes 34, as illustrated in FIG. 1, or by other adjustable means such as clamps, telescoping members, or the like.

A pallet roller 40 is rotatably attached to a top of the roller frame 20 about a substantially horizontal pallet roller axis PA oriented substantially perpendicular to the loading direction LD and perpendicular to the bottom front edge 4A of the assembly table 4. The pallet roller 40 is configured to support a pallet 10 in a substantially horizontal position as shown in FIGS. 3 and 4 such that the supported pallet 10 can be rolled into the pallet opening 8.

The pallet roller axis PA is oriented to intersect the assembly table 4 such that, as illustrated in FIG. 3, a top edge 50 of a finished pallet 10 with a first face 52 thereof resting on the assembly table 4 can be pivoted, as indicated in phantom lines, by an operator up and over a bottom edge 54 of the pallet 10 resting in proximity to the bottom front edge 4A of the assembly table 4 to a substantially horizontal position with the first face 52 oriented substantially horizontally and on top of the pallet 10, and an opposite second face 56 resting on the pallet roller 40 with the roller frame 20 in the receiving position.

One end of the pallet 10 is then resting on the pallet roller 40 supported on the roller frame 20 and pulley rollers 22 and the operator is supporting the opposite end of the pallet 10. The operator can then roll the pallet 10, pallet roller 40, and roller frame 20 away from the assembly table 4 toward the remote position until the pallet 10 is aligned with the entrance 12 to the pallet opening 8 as illustrated in FIG. 4. The operator then moves the pallet 10 in the loading direction into the pallet opening 8 by rolling same on the pallet roller 40.

Such assembly tables 4 are typically adjustable to make pallets of varying sizes. By moving the pulley frame 28 closer to, or farther from the entrance 12 to the pallet opening 8 as described above, the pallet roller 40 can be properly oriented to receive pallets of varying sizes from the assembly table 4.

Conveniently, a bias element 60 is provided that is operative to exert a bias force BF on the roller frame 20 towards the receiving position such that when at rest, the roller frame 20 is in the receiving position ready to receive another pallet from the assembly table 4. The bias element 60 can be provided by a counterweight 62 attached to the roller frame and passing over a weight pulley 64 such that gravity pulls the counterweight down and exerts a force in the direction BF as illustrated in FIGS. 1-4. With such a bias element 60 the pallet roller 40 and attached roller frame 20 return to the receiving position, ready to receive another pallet once the operator rolls the pallet 10 off the pallet roller 40.

Figure 7:
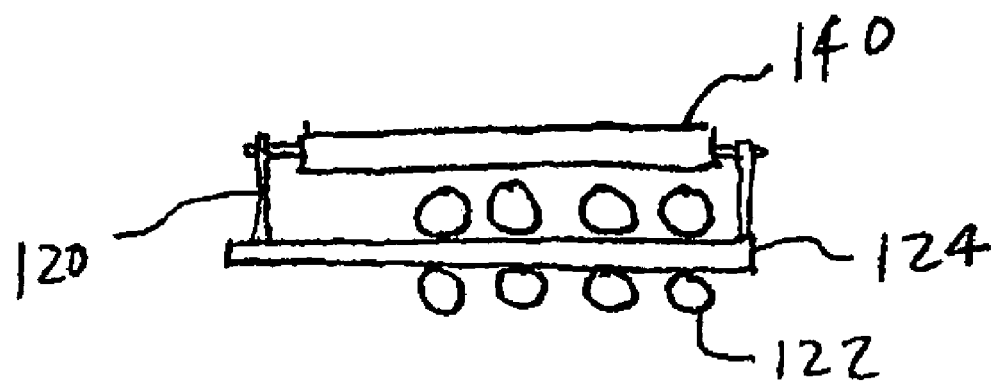
FIG. 7 is a schematic front view of an alternate of the roller frame and pulley rollers.
Figure 8:
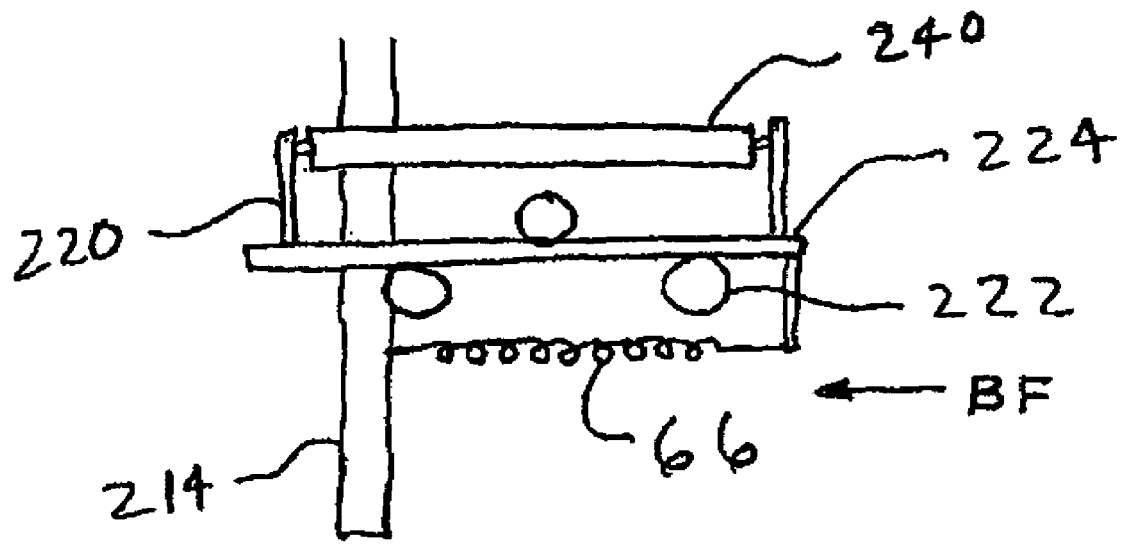
FIG. 8 is a schematic front view of a further alternate of the roller frame and pulley rollers.

FIG. 7 illustrates an alternate embodiment of the roller frame 120 with a pallet roller 140 and a rail 124 engaging rollers 122 that could include flanges. Alternatively the rail 124 and rollers 122 could be enclosed and confined in a tube or the like. Similarly FIG. 8 schematically illustrates another alternate arrangement of the roller frame 220 with a pallet roller 240 and a rail 224 engaging rollers 222. Further arrangements of rollers, rails, telescoping tubes, or like movable attachment mechanisms will be apparent to those skilled in the art for providing the required motion of the pallet roller with respect to the pallet stacker. FIG. 8 further illustrates a spring 64 attached to the roller frame 220 and a vertical frame member 214 of the pallet stacker and thus providing the bias force BF to return the pallet roller to the receiving position after the operator has rolled the pallet off the pallet roller and into the pallet opening.

The roller frame 20 and pallet roller 40 can be movably attached in front of the entrance to the pallet opening of many conventional types of pallet stackers, such that the pallet stacker can be positioned in front of and to one side of a typical assembly table and operated in the manner described above to reduce the effort required by the operator to move finished pallets from the assembly table into the pallet opening.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An apparatus to facilitate movement of a pallet from an assembly table to a pallet stacker, wherein the pallet stacker defines a pallet opening oriented such that a substantially horizontal pallet can be moved in a loading direction through an entrance of the pallet opening and into the pallet opening, the apparatus comprising:

a roller frame adapted for movable attachment to the pallet stacker in front of the entrance to the pallet opening such that the roller frame can be moved, in a direction substantially horizontal and perpendicular to the loading direction, from a receiving position, where during operation the roller frame is nearest to the assembly table, to a remote position, where during operation the roller frame is farthest from the assembly table; and a pallet roller rotatably attached to a top of the roller frame about a substantially horizontal axis oriented substantially perpendicular to the loading direction, the pallet roller adapted to support a pallet in a substantially horizontal position such that the supported pallet can be rolled into the pallet opening.

2. The apparatus of claim 1 wherein a distance between the roller frame and the entrance to the pallet opening is adjustable.

3. The apparatus of claim 1 comprising a plurality of pulley rollers adapted for rotatable attachment to the pallet stacker about axes substantially aligned with the loading direction, and wherein the roller frame comprises at least one rail engaging the pulley rollers.

4. The apparatus of claim 3 comprising:

a pair of upper pulley rollers adapted for rotatable attachment to the pallet stacker about laterally spaced upper axes oriented such that a line between the upper axes is substantially horizontal;

a pair of lower pulley rollers adapted for rotatable attachment to the pallet stacker about laterally spaced lower axes oriented such that a line between the lower axes is substantially horizontal and below the line between the upper axes; and wherein the roller frame comprises an upper rail engaging flanges on a top of the upper pulley rollers and a lower rail engaging flanges on a bottom of the lower pulley rollers.

5. The apparatus of claim 3 wherein the pulley rollers are mounted on a pulley frame adapted for mounting on the pallet stacker such that a distance between the pulley frame and the entrance to the pallet opening is adjustable.

6. The apparatus of claim 5 comprising at least one extension member extending from the pulley frame and substantially aligned with the loading direction, and adapted for attachment to the pallet stacker at a plurality of locations along a length thereof.

7. The apparatus of claim 1 further comprising a bias element operative to exert a bias force on the roller frame towards the receiving position such that when at rest, the roller frame is in the receiving position.

8. The apparatus of claim 7 wherein the bias element comprises one of a counterweight and a spring.

* * * * *

UNITED STATES PATENT AND TRADEMARK OFFICE
CERTIFICATE OF CORRECTION

PATENT NO. : 7,650,690 B2  
APPLICATION NO. : 11/301861  
DATED : January 26, 2010  
INVENTOR(S) : Robert Trembley Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1079 days.

Signed and Sealed this

Twenty-third Day of November, 2010

David J. Kappos  
*Director of the United States Patent and Trademark Office*